Figure 1:
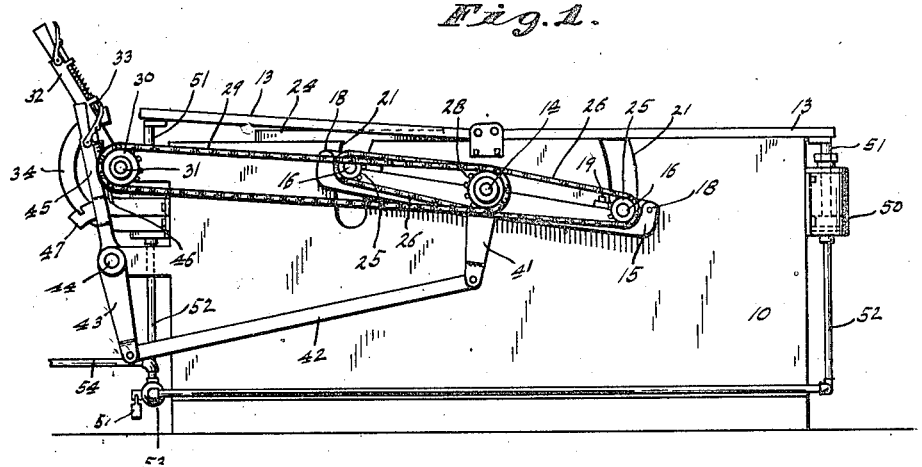

L. A. & C. E. THORNBURG.
TWIN POT GLASS FURNACE.
APPLICATION FILED MAY 2, 1913.

1,183,696.

Patented May 16, 1916.
2 SHEETS—SHEET 1.

Witnesses
Frank A. Fahle
Josephine Gasper

Inventors
Lincoln A. Thornburg,
Clara E. Thornburg.
By Arthur M. Leood
Attorney

L. A. & C. E. THORNBURG.
TWIN POT GLASS FURNACE.
APPLICATION FILED MAY 2, 1913.
1,183,696.
Patented May 16, 1916
2 SHEETS—SHEET 2.
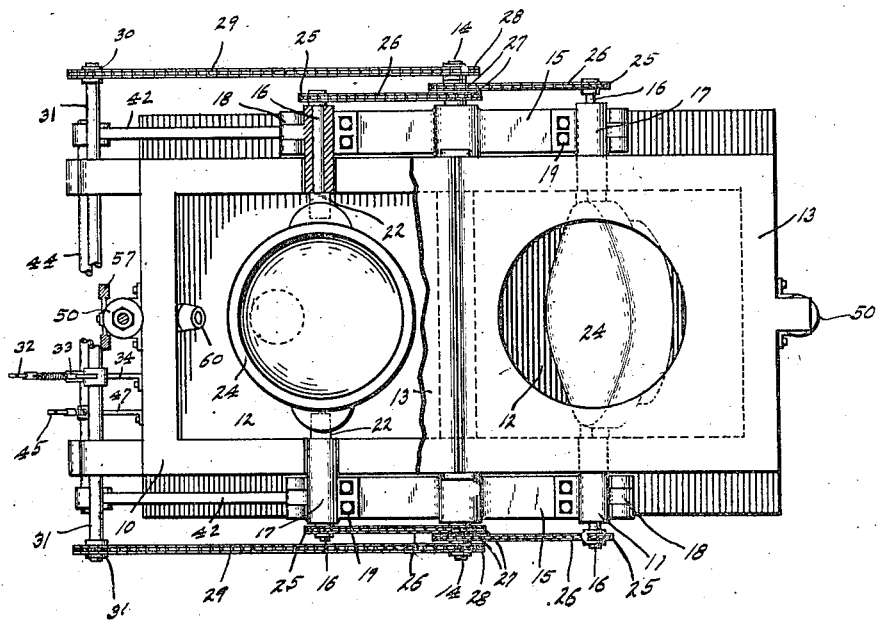
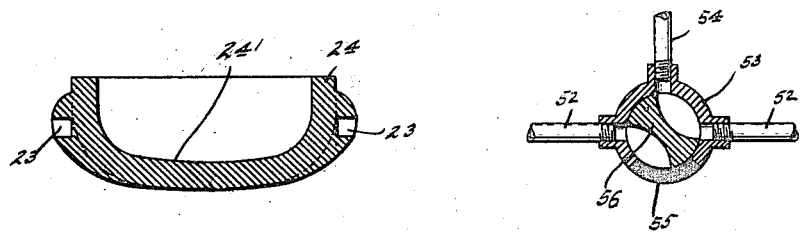
Witnesses
Frank A. Fahl
Josephine Gasper
Inventors
Lincoln A. Thornburg,
Clara E. Thornburg
By Arthur M. Hood
Attorney

UNITED STATES PATENT OFFICE.

LINCOLN A. THORNBURG AND CLARA E. THORNBURG, OF MUNCIE, INDIANA.

TWIN-POT GLASS-FURNACE.

1,183,696.

Specification of Letters Patent.

Patented May 16, 1916.

Application filed May 2, 1913. Serial No. 764,996.

*To all whom it may concern:*

Be it known that we, LINCOLN A. THORNBURG and CLARA E. THORNBURG, citizens of the United States, residing at Muncie, in the county of Delaware and State of Indiana, have invented a new and useful Twin-Pot Glass-Furnace, of which the following is a specification.

The object of our invention is to produce a twin-pot glass drawing apparatus of such character that the drawing operation may be practically continuous, taking place from one pot while the other is being drained, and the construction being such that either pot may be readily removed and another replaced when damaged without discontinuing drawing from the other and such that a minimum amount of waste glass will be produced.

The accompanying drawings illustrate our invention.

Figure 2:
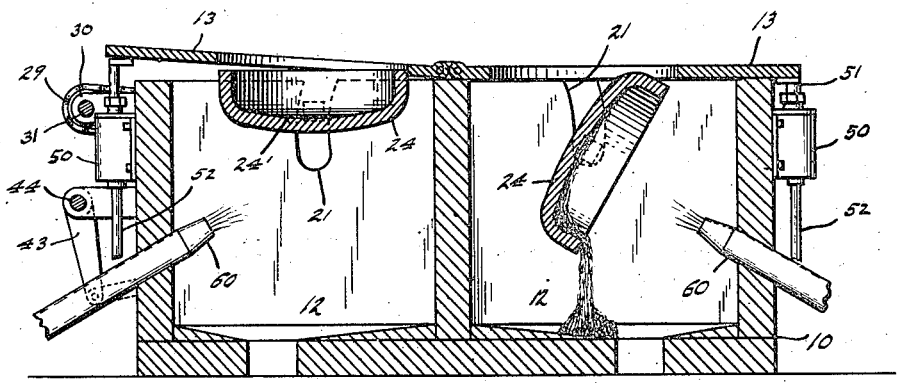

Figure 1 is a side elevation of an embodiment of our invention; Fig. 2 a central vertical section; Fig. 3 a plan; Fig. 4 a detail of one of the pots; and Fig. 5 a detail of a convenient valve for controlling the flow of the air to the cover lifting cylinder.

In the drawings 10 indicates a furnace or heater box divided by a partition into two chambers 12, 12. Pivoted upon a suitable pin 14 projected at each side of the furnace 10, is a beam 15 which, at its opposite ends, is provided with transverse bearings adapted to receive and support stud shafts 16. The upper part of the bearing for each stud shaft 16 is conveniently formed in a bearing cap 17 hinged at 18 upon the beam 15 and normally held in place by a bolt or other suitable means 19 which is readily removable in order to permit the cap 17 to be swung away so as to permit the ready removal of the stud shaft 16 in order to replace a damaged pot. The sides of the furnace 10 are slotted, as indicated at 21 to permit the passage of the stud shafts, and each of said stud shafts at its inner end is provided with a polygonal portion 22 which fits into the correspondingly-formed pocket 23 in the side of the pot 24.

The form of the pot is quite material. From our past experience we have found that with a practically flat bottom pot, especially a double pot of the form now commonly in use, the glass becomes so chilled, when nearly exhausted from the pot, that there is a distinct tendency to materially increase the diameter of the cylinder as it is drawn from the pot and there is also a very considerable waste of glass due to the unavoidable chilling which results from the comparative thinness of the body of glass toward the end of the draw. Instead of making the pot substantially flat in the bottom we distinctly dish the bottom, as indicated at 24', so that at all times the thickness of the glass at the center of the pot is materially greater than at the sides so that, as the draw reaches its end the supply of glass comes from the center of the pot instead of from the outer parts. As a consequence we have found that it is possible to draw almost the entire body of glass from the pot. We have found it also advisable to make the bottom of the pot of substantially uniform thickness and by providing the recessed lugs 23 at the sides, in place of integral trunnions, we have found it possible to materially lighten the pot and thus decrease the cost of its production and consequently effect a saving in pot replacement.

At its outer end each stud shaft 16 is provided with a sprocket wheel 25 (or other means by which it may be tilted) and over each of these sprocket wheels is carried a chain 26 which, in turn, is carried over one of a pair of sprocket wheels 27, 27 journaled upon the pin 14. The two sprocket wheels 27, 27 are connected together and to a sprocket wheel 28, and running over the sprocket wheel 28 is a chain 29 which passes over a sprocket wheel 30 carried by a shaft 31 journaled in suitable brackets at one end of the furnace and provided with an operating lever 32 carrying a detent 33 which coöperates with a suitable segment 34 by which the position of the shaft 31 may be determined and held. The construction just described and illustrated in Fig. 1, is preferably duplicated upon the opposite side of the structure as indicated in Fig. 3.

Each beam 15 is provided with a depending arm 41 to which is connected one end of link 42 the opposite end of said link being pivoted to an arm 43 carried by a shaft 44 which is journaled in suitable brackets on the furnace adjacent shaft 31 and provided with an operating lever 45 having a detent 46 which coöperates with the segment 47.

Arranged to cover the upper ends of chambers 12, 12 are cover plates 13, said cover plates being suitably perforated to closely surround the adjacent pot 24. Mounted at opposite ends of the furnace 10 are two air cylinders 50, 50 each of which is provided with a piston and piston-stem 51 adapted to engage the adjacent cover plate 13. Each air cylinder is provided with a pipe line 52 and each of these pipe lines is connected to a suitable valve casing 53 into which leads an air supply line 54 and from which leads an exhaust passage 55, and in which a valve 56 of ordinary form is arranged for alternate supply and exhaust of the two lines 52, 52. The valve 56 may be conveniently provided with a foot lever 57 placed where it can be operated by the operative. The covers 13, 13 may be swung back far enough to give access to the subjacent pot but the plungers 51 need only lift the covers sufficiently to give clearance for the tilting operation of the pots. Each of the chambers 12, 12 is heated by a suitable heater, as for instance an oil burner 60, and each of said chambers is preferably formed so that the glass therein will discharge through a drainage opening.

The shafts of the two pots are so associated with their driving mechanism that when one pot is in a substantially horizontal glass retaining position the other pot will be sufficiently inverted to permit the glass if it be sufficiently molten, to drain therefrom.

In operation one pot is brought to a glass retaining position, by a proper turning of shaft 31, and this pot is projected upwardly partially through the adjacent cover plate by a rocking of shaft 44. Thereupon it is charged with molten glass and this glass is drawn therefrom in the usual manner. When the drawing operation has been completed there will remain in the pot a certain amount of glass which is generally too stiff to drain readily therefrom even when the pot is inverted. The operator will first press upon lever 57 so as to cause the appropriate plunger 51 to lift the adjacent cover plate so as to permit the operator to first swing shaft 31 so as to invert the freshly emptied pot and to revert the other pot and at about the same time the operator, by swinging the shaft 44, will swing the beams 15 so as to present the newly reverted pot upwardly through the adjacent cover in position to receive a charge of the molten glass, whereupon the drawing operation is repeated and in the meantime the inverted pot is subjected to the heat of its chamber and the surplus glass therein is caused to drain therefrom without the formation of chilled teats.

The heat within each chamber 12 is so regulated as to maintain the adjacent pot in proper working temperature and so as to prevent any unnecessary chilling of the freshly introduced glass.

The cover plates may conveniently be made of castings and, by reason of allowing the pot to extend through the top plate will give a surface chill to the new charge of glass so that the drawing operation may be begun quickly and continued rapidly and increase production.

By the alternate use of the two pots, heating and drawing from one, while draining the other, we are able to present each pot in such condition that the fresh charge is not chilled by the pot bottom and consequently cylinders of much better quality throughout their lengths may be produced.

It will be noticed that by the use of two companion pots it becomes possible for us to melt and drain the residue from one pot during the drawing operation from the other, and that this melting and draining operation may take place with the pot tilted at an angle instead of being square as is necessary in the use of a double pot. As a consequence there is no formation of teats upon the bottom of the draining pot, as is the case in a double pot construction.

We claim as our invention:

1. In a glass handling apparatus, the combination with a furnace, of a pot-supporting beam structure, a pair of pots horizontally journaled on opposite ends of said beam structure, driving means connected with said pots for swinging them on their journals, means for swinging the beam structure to raise and lower the pots, and heating means for said pots, said heating means comprising a pair of hinged perforated cover plates, and means for alternately lifting said cover plates.

2. In a glass handling apparatus, the combination with a furnace, of a pot-supporting beam structure, a pair of pots horizontally journaled on opposite ends of said beam structure, driving means connected with said pots for swinging them on their journals, and means for swinging the beam structure to raise and lower the pots.

3. A glass drawing apparatus comprising two independently movable drawing pots mounted in horizontally spaced relation, and means for elevating either pot and simultaneously depressing the other pot.

4. A glass drawing apparatus comprising a horizontally disposed tiltable support, two horizontally spaced, independently movable drawing pots, one at each end of said support, and means for oscillating said support to elevate either pot and simultaneously depress the other pot.

5. A glass drawing apparatus comprising two independently movable drawing pots mounted in horizontally spaced relation, means for elevating either pot and simultaneously depressing the other pot, and means for dumping each pot as it is being lowered.

6. A glass drawing apparatus comprising a horizontally disposed tiltable support, two horizontally spaced drawing pots carried by said support, one at each end thereof, means for oscillating said support to alternately raise and lower said pots, and means for causing the pot that is lowered to assume a dumping position as the other assumes an operative position.

7. A glass drawing apparatus comprising a horizontally disposed rock shaft, a tiltable support attached to said rock shaft, independently movable drawing pots carried by said support in horizontally spaced relation and located on opposite sides of said rock shaft, and means for oscillating said rock shaft to elevate either pot and simultaneously depress the other pot.

8. A glass drawing apparatus comprising a horizontally disposed rock shaft, spaced apart beams attached to and movable with said rock shaft, drawing pots supported by said beams and located on opposite sides of said rock shaft, and means for oscillating said rock shaft to raise and lower said pots alternately into and out of operative position.

9. A glass drawing apparatus comprising a horizontally disposed rock shaft, a tiltable support attached to said rock shaft, pivoted drawing pots carried by said support and located on opposite sides of said shaft, means for actuating said rock shaft to raise and lower said pots alternately into and out of position, and means for rocking said pots in said support.

10. A glass drawing apparatus comprising a horizontally disposed rock shaft, spaced apart beams attached to and movable with said rock shaft, drawing pots supported by said beams and located on opposite sides of the rock shaft, means for actuating said rock shaft to raise either pot and to simultaneously depress the other pot, and means for rocking said pots in their supports.

11. A glass drawing apparatus comprising a furnace, two spaced apart independently pivoted drawing pots, means for elevating either pot and simultaneously depressing the other pot, cover plates for each pot, and means for moving the cover plates to permit pivotal movement of the pots.

In witness whereof, we, have hereunto set our hands at Indianapolis, Indiana, this sixteenth day of April, A. D. one thousand nine hundred and thirteen.

LINCOLN A. $\overset{\text{his}}{\times}$ THORNBURG.
CLARA E. THORNBURG.$_{\text{mark}}$ Witnesses:
ARTHUR M. HOOD,
FRANK A. FAHLE.